(12) United States Patent
Zhang et al.

(10) Patent No.: US 12,120,312 B2
(45) Date of Patent: Oct. 15, 2024

(54) VIDEO ENCODING RATE CONTROL FOR INTRA AND SCENE CHANGE FRAMES USING MACHINE LEARNING

(71) Applicant: Intel Corporation, Santa Clara, CA (US)

(72) Inventors: Ximin Zhang, San Jose, CA (US); Sang-hee Lee, San Jose, CA (US); Keith W. Rowe, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 16/950,367

(22) Filed: Nov. 17, 2020

(65) Prior Publication Data

US 2021/0067785 A1   Mar. 4, 2021

(51) Int. Cl.
*H04N 19/159*    (2014.01)
*G06N 3/084*    (2023.01)
*H04N 19/176*    (2014.01)
*H04N 19/179*    (2014.01)
*H04N 19/30*    (2014.01)
*H04N 19/70*    (2014.01)

(52) U.S. Cl.
CPC .......... *H04N 19/159* (2014.11); *G06N 3/084* (2013.01); *H04N 19/176* (2014.11); *H04N 19/179* (2014.11); *H04N 19/70* (2014.11); *H04N 19/30* (2014.11)

(58) Field of Classification Search
None
See application file for complete search history.

(56) References Cited

U.S. PATENT DOCUMENTS

| | | | |
|---|---|---|---|
| 2002/0181583 A1* | 12/2002 | Corbera | H04N 19/154 375/E7.157 |
| 2013/0208942 A1* | 8/2013 | Davis | H04N 19/61 382/100 |
| 2018/0350109 A1* | 12/2018 | Pan | G06T 9/002 |
| 2019/0132591 A1* | 5/2019 | Zhang | H04N 19/59 |
| 2020/0025611 A1* | 1/2020 | Mai | G01J 3/4531 |
| 2020/0092556 A1* | 3/2020 | Coelho | H04N 19/176 |
| 2020/0329233 A1* | 10/2020 | Nemirofsky | H04N 19/136 |
| 2020/0374514 A1* | 11/2020 | Gao | H04N 19/587 |
| 2020/0374524 A1* | 11/2020 | Gao | H04N 19/105 |
| 2021/0067785 A1 | 3/2021 | Zhang et al. | |

OTHER PUBLICATIONS

International Search Report and Written Opinion for PCT Patent Application No. PCT/US2021/050887, dated Jan. 4, 2022.
International Preliminary Report on Patentability from PCT/US2021/050887 notified Jun. 1, 2023, 9 pgs.

* cited by examiner

*Primary Examiner* — Reza Aghevli
(74) *Attorney, Agent, or Firm* — Akona IP PC

(57) ABSTRACT

Techniques related to quantization parameter estimation for coding intra and scene change frames are discussed. Such techniques include generating features based on an intra or scene change frame including a proportion of smooth blocks and one or both of a measure of block variance and a prediction distortion, and applying a machine learning model to generate an estimated quantization parameter for encoding the intra or scene change frame.

20 Claims, 6 Drawing Sheets

VIDEO ENCODING RATE CONTROL FOR INTRA AND SCENE CHANGE FRAMES USING MACHINE LEARNING

BACKGROUND

In compression/decompression (codec) systems, compression efficiency and video quality are important performance criteria. Visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

In the context of video encoding, bit rate control (BRC) is a key factor for the differentiation of one video solution from other solutions. Under many circumstances, controlling the frame size to a predictable value is important especially for the network related applications. Given a target frame size, BRC techniques adjust the quantization parameter (QP) value of each frame to control the number of bits generated from the frames. An ongoing challenge in BRC is handling intra frames and scene change frames. Since those frames are the reference anchors for subsequent frames, the optimal target size selection can provide substantial subjective and objective improvement. However, such frames have no correlation with previous frames, which makes it difficult to predict the QP value. When the predicted QP value is substantially different with respect to the target value, poor quality of the remaining frames in the same group of pictures (GOP) or beyond results, sometimes even causing video buffering verifier (VBV) buffer overflow/underflow with single pass encoding. Even when second pass encoding is allowed, BRC requires many first pass encoding statistics and collecting the statistics is computationally expensive particularly for hardware solutions that must use large amounts of additional gate counts to collect the statistics. In some contexts, more than two passes are needed to obtain an accurate QP for the target frame size.

It may be advantageous to improve the accuracy and efficiency of QP selection for intra frames and scene change frames for improved compression efficiency and/or video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
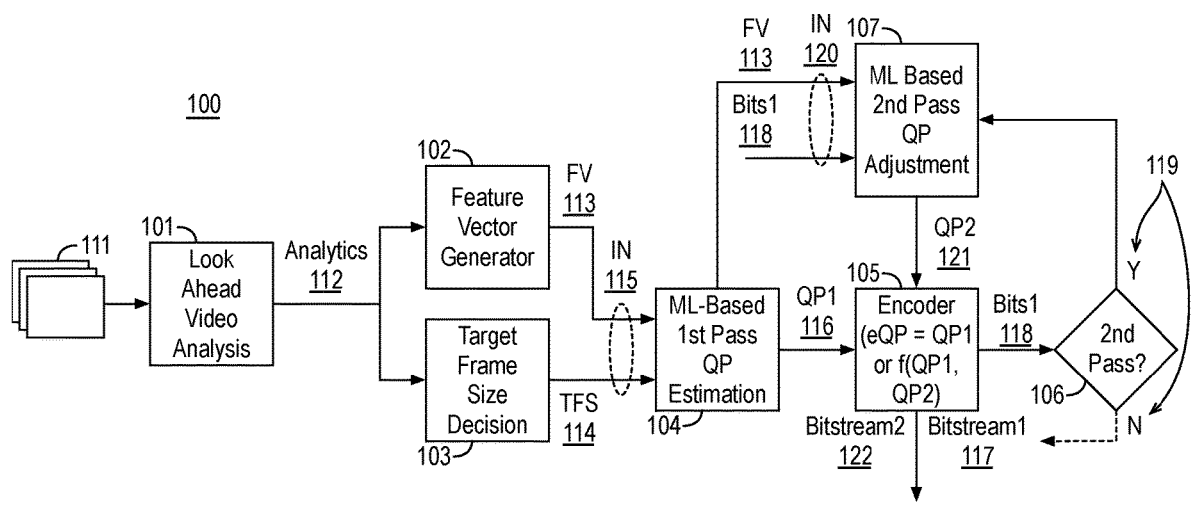
FIG. 1 is an illustrative diagram of an example system for video coding including machine learning based quantization parameter selection for intra and scene change frames.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to the selection of quantization parameters for intra and scene change frames using machine learning.

As described above, in modern video coding, quantization parameter (QP) selection for bit rate control (BRC) is an important feature for improved efficiency and/or video quality and to differentiate among video encoding solutions. The techniques discussed herein provide a machine learning based QP selection for rate control of intra and scene change frames. Such techniques may employ one or more of generation of a feature vector based on a set of statistics from look ahead analysis of the intra and/or scene change frames, a machine learning based first pass QP estimation technique to estimate the QP according to a target frame size and the generated feature vector, and, in cases where second pass encoding is needed, a machine learning based second pass QP adjustment technique to achieve accurate frame size control. The techniques discussed herein provide highly accurate first pass QP estimation (~99% accurate with respect to ground truth) and essentially perfect second pass QP adjustment (~100% accurate with respect to ground truth) in a wide range of coding contexts and input video scenarios. The discussed techniques may be employed in any encoding context and using any standard to generate a standards compliant bitstream that may be H.264/MPEG-4 Advanced Video Coding (AVC) standards compliant, H.265 High Efficiency Video Coding (HEVC) standards compliant, VP9 standards compliant, etc.

In the context of bit rate control (BRC), the core need is to decide the target frame size of each frame and to find the QP value to achieve the target size such that the best video quality can be obtained with the target bitrate constraint. As used herein, the terms target frame size and target bitrate for a frame are used interchangeably and indicate a target number of bits used to represent a frame after encode of the frame. The techniques discussed herein generate an estimated QP for a scene change frame or intra frame by applying a pretrained machine learning model to a feature vector generated based on characteristics of the frame and/or using look ahead analysis of the frame and a target frame size or bitrate for the frame. As used herein, the term intra frame indicates a frame reconstructed using only information from within the frame and without use of information from another frame of a video sequence. The term scene change frame indicates a frame that is immediately after a scene change in a video sequence. Such scene change frames may also be intra frames depending on the coding structure of the video sequence. As used herein, a video sequence may include any number of video pictures or frames for coding. The terms picture and frame are used interchangeably herein. The term quantization parameter indicates a value that defines a step size for quantizing transform coefficients.

In some embodiments, the feature vector includes a proportion of smooth blocks of the intra or scene change frame and at least one of a measure of block variance of blocks of the intra or scene change frame or a prediction distortion of the intra or scene change frame. Such features are discussed further herein. Notably, it has been found that inclusion of the proportion of smooth blocks (i.e., the proportion of blocks having a block variance that is less than a particular threshold) in a feature vector including other frame characteristics such as average block variance and/or prediction distortion improves QP prediction accuracy particularly in the context of intra or scene change frame. In some embodiments, the intra or scene change frame is encoded using the estimated QP and, if the resultant number of bits deviates from the target number of bits by more than a threshold, a second estimated QP is generated by applying the pretrained machine learning model to the feature vector and the number of bits from the encode using the first estimated QP (i.e., in place of the target number of bits) and the first and second estimated QPs are combined to generate an encode QP for encode in a second pass. Furthermore, the generated input and output (i.e., the input being the feature vector and target frame size and the output being the encode QP) can be used to train the machine learning based model on the fly.

FIG. 1 is an illustrative diagram of an example system 100 for video coding including machine learning based quantization parameter selection for intra and scene change frames, arranged in accordance with at least some implementations of the present disclosure. As shown in FIG. 1, system 100 includes a look ahead video analysis module 101, a feature vector generator 102, a target frame size decision module 103, a machine learning based QP estimation module 104, an encoder 105, a second pass decision module 106, and a machine learning based second pass QP adjustment module 107. Furthermore, system 100 may provide pretraining of a machine learning model employed by machine learning based QP estimation modules 104, 107.

As shown, system 100 receives input video 111 for coding and system 100 provides video compression to generate a bitstream (either a first pass bitstream 117 or a second pass bitstream 122 as discussed further below) such that system 100 may be a video encoder implemented via a computer or computing device or the like. As discussed further herein, system 100 efficiently determines a highly accurate QP for encode of intra or scene change frames of input video 111. Bitstreams 117, 122 may be any suitable bitstream such as standards compliant bitstreams. For example, 117, 122 may be AVC standards compliant, HEVC standards compliant, VP9 standards compliant, etc. System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

System 100 may include other modules or components not shown for the sake of clarity of presentation. For example, encoder 105 (and look ahead video analysis module 101) may include one or more of a partition module, a transform module, a quantization module, an intra prediction module, a motion estimation module, a motion compensation module, a scanning module, an entropy encode module, etc. Furthermore, encoder 105 may include a local decode loop including an inverse quantization module, an inverse transform module, and an adder for combining reconstructed residual blocks with reference blocks, a deblock filtering module, a sample adaptive offset (SAO) filtering module, etc. Such modules and the operations associated therewith are known to those of skill in the art and are not discussed further herein for the sake of clarity in presentation.

As discussed, system 100 receives input video 111. Input video 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Techniques discussed herein are discussed with respect to frames and blocks for the sake of clarity of presentation. However, such frames may be characterized as pictures, video frames or pictures, sequences of frames or pictures, video sequences, or the like, and such blocks may be characterized as coding units, coding blocks, macroblocks, sub-units, sub-blocks, or the like. For example, a picture or frame of color video data may include a luminance plane or component and two chrominance planes or components at the same or different resolutions with respect to the luminance plane. Input video 111 may include pictures or frames that may be divided into blocks of any size, which contain data corresponding to, for example, M×N blocks of pixels. Such blocks may include data from one or more planes or color channels of pixel data. As used herein, the term block may include macroblocks, coding units, or the like of any suitable sizes. As will be appreciated such blocks may also be divided into sub-blocks for prediction, transform, or the like.

Look ahead video analysis module 101 receives input video 111, which includes multiple video frames. As shown, look ahead video analysis module 101 generates analytics data 112 based on input video such that analytics data 112 include any suitable data and data structures generated using input video 111 for use in feature vectors and/or target frame size decisions. Look ahead video analysis module 101 may apply look ahead analysis using any number of frames. For example, look ahead analysis is applied to N frames where N is one for extreme low latency coding applications and can be up to 60 for applications that can tolerate high delay. Analytics data 112 is provided to target frame size decision module 103, which may generate a target frame size (TFS) 114 for each frame of input video 111 using any suitable technique or techniques. Notably, target frame sizes 114 include a target frame size for each intra and/or scene change frame of input video 111 generated using techniques known in the art based on analytics data 112. It is then the objective of remaining modules of system 100 to determine a QP for encode that, after encode, generates a number of bits for each intra and/or scene change frame that closely matches the target frame size (or target bitrate). As discussed, by closely matching the target frame size, particularly for each intra and/or scene change frame, improved video coding is achieved.

As shown, feature vector generator 102 receives analytics data 112 and feature vector generator 102 generates a feature vector 113 of any number of features for each intra and/or scene change frame. Feature vector 113 may include any number of features and the features may be any suitable features representative of the intra and/or scene change frame that are pertinent to the generation of a highly accurate QP. In some embodiments, feature vector 113 includes features generated based on downsampling the intra and/or scene change frame. In some embodiments, an average block variance for the downsampled intra and/or scene change frame, a proportion or percentage of very smooth blocks for the downsampled intra and/or scene change frame, and a prediction distortion (based on simple intra/inter prediction) for the downsampled intra and/or scene change frame are generated and used as features of feature vector 113. In some embodiments, such processing may be applied to the intra and/or scene change frame instead of a downsampled version thereof. In some embodiments, in addition to the average block variance, the proportion or percentage of very smooth blocks, and the prediction distortion, the downsampled intra and/or scene change frame is encoded using a look ahead encode (constant QP encode) and the resultant number of bits and the proportion or percentage of syntax bits are used as features of feature vector 113. Notably, the fewer feature embodiments provide lower analysis complexity at the cost of lower QP accuracy while embodiments having more features provide higher QP accuracy at the cost of higher analysis complexity.

Figure 2:
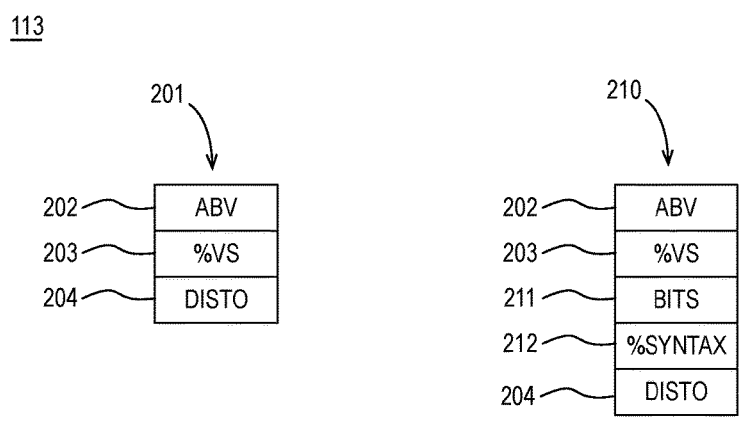
FIG. 2 is an illustrative diagram of example feature vectors for use in quantization parameter prediction for video coding.

FIG. 2 is an illustrative diagram of example feature vectors 201, 210 for use in quantization parameter prediction for video coding, arranged in accordance with at least some implementations of the present disclosure. As shown in FIG. 2, in an embodiment, a feature vector 201 includes an average block variance 202 (ABV), a proportion of very smooth blocks 203 (% VS), and a distortion 204 (DISTO). Although illustrated with respect to average block variance 202 other measures of block variance may be used in place of or in addition to average block variance 202 such as a median block variance or a variance of the block variances. Furthermore, proportion of very smooth blocks 203 may be provided as a percentage, a value in the range of zero to one, or a value in any suitable value range. Distortion 204 may be any suitable distortion measure that indicates the difference between actual pixel values (i.e., input pixel values) of a frame or a downsampled frame and predicted pixel values, such as a sum of absolute values of differences, a sum of squares of the differences, or the like. Furthermore, although illustrated with respect to average block variance 202, proportion of very smooth blocks 203, and a distortion 204 being in that order, feature vector 201 may include such features in any order.

Also as shown in FIG. 2, in another embodiment, a feature vector 210 includes average block variance 202, proportion of very smooth blocks 203, a number of encode bits 211, a proportion of syntax bits 212, and distortion 204. For example, average block variance 202, proportion of very smooth blocks 203, and distortion 204 may match those discussed with respect to feature vector 201 and feature vector 210 may add number of encode bits 211 and proportion of syntax bits 212. In some embodiments, number of encode bits 211 and proportion of syntax bits 212 are generated based on an encode of an intra frame or scene change frame or a downsampled version of the intra frame or scene change frame (such as a standardized size intra frame or scene change frame) using simple intra/inter prediction. As used herein, the term simple prediction indicates the prediction evaluates limited numbers of available intra and/or inter modes (i.e., using only very few intra directions and simple or no motion estimation), evaluates limited or no partitioning options for blocks, limits or eliminates in loop and out of loop filtering, and so on. Number of encode bits 211 then includes the total number of bits generated based on the simple prediction (Tbits) and proportion of syntax bits 212 is the proportion of those bits that are syntax bits (Sbits/Tbits). Proportion of syntax bits 212 may be provided as a percentage, a value in the range of zero to one, or a value in any suitable value range. Furthermore, although illustrated with respect to average block variance 202, proportion of very smooth blocks 203, number of encode bits 211, proportion of syntax bits 212 and distortion 204 being in that order, feature vector 210 may include such features in any order.

Figure 3:
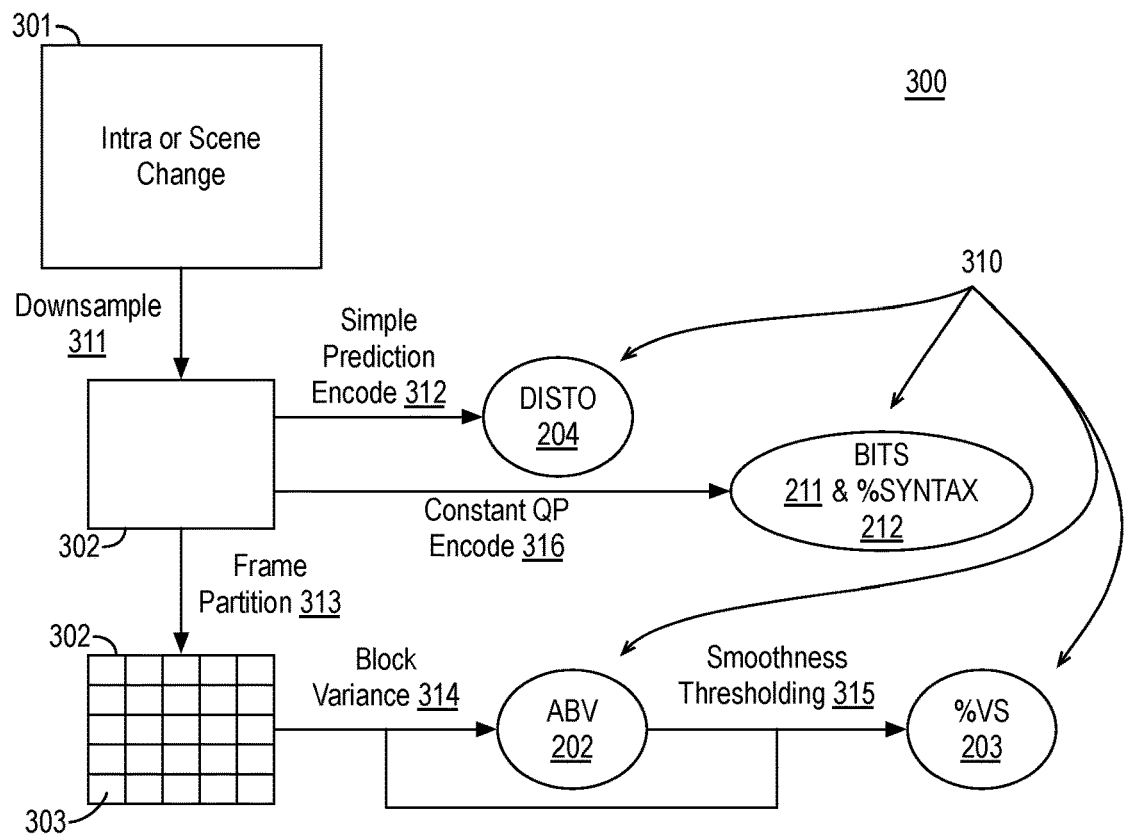
FIG. 3 is an illustrative diagram of exemplary processing to generate features for feature vectors for use in quantization parameter prediction for video coding.

FIG. 3 is an illustrative diagram of exemplary processing 300 to generate features 310 for feature vectors 201, 210 for use in quantization parameter prediction for video coding, arranged in accordance with at least some implementations of the present disclosure. As shown in FIG. 3, an intra or scene change frame 301 is received for processing. Intra or scene change frame 301 is optionally downsampled by downsample operation 311 to generate a downsampled intra or scene change frame 302. Such downsampling may be performed using any suitable technique or techniques and at any downsampling rate such as by a factor of two in both the horizontal and vertical dimensions, a factor of four in both dimensions, a factor of eight in both dimensions or the like. In some embodiments, downsample operation 311 downsamples intra or scene change frame 301 to a standardized resolution. As discussed, such downsampling is optional. Notably, features 310 are characterized as corresponding to intra or scene change frame 301 (and pixels, blocks, etc. thereof) whether downsampling is performed or not.

Processing continues with respect to downsampled intra or scene change frame 302 or intra or scene change frame 301 in a number of processing paths to generate features 310. Any number of such processing paths may be employed to determine features 310. In some embodiments, downsampled intra or scene change frame 302 is partitioned via frame partition operation 313 into blocks 303 of any size. In some embodiments, blocks 303 are 16×16 pixel blocks, which provides an advantageous balance between accuracy and computational complexity. However, any pixel blocks sizes such as 8×8 may be employed. After frame partition operation 313, a block variance 314 is determined for each block 303. In some embodiments, block variances 314 may be any suitable value such as a measure of how far the pixel values of each block spread from the average value thereof. Using block variances 314, average block variance 202 is generated as an average of some or all of block variances 314. Furthermore, other analytic data may be generated using block variances 314 for deployment in feature vectors 201, 210 such as a median block variance or a variance of the block variances.

Furthermore, as shown, block variances 314 may each be threshold via a smoothness thresholding operation 315 to determine proportion of very smooth blocks 203. In some embodiments, a determination is made as to which of blocks 303 are smooth (or very smooth) by comparing the block variance of the block to a threshold. If the block variance compares unfavorably to the threshold, the block is deemed to be smooth and, if not, the block is deemed to be not smooth. As used herein, the term compares favorably with respect to a threshold indicates a value is greater than (in some embodiments) or greater than or equal to (in other embodiments) the threshold. Similarly, the term compares unfavorably with respect to a threshold indicates a value is less than (in some embodiments) or less than or equal to (in other embodiments) the threshold. Proportion of very smooth blocks 203 is then determined as the ratio of the number of blocks deemed smooth to the total number of blocks.

In addition or in the alternative, downsampled intra or scene change frame 302 is encoded using one or both of a simple prediction encode 312 and a look ahead encode such as a constant QP encode 316. In some embodiments, such encodes are performed using different encode techniques. In some embodiments, the same encode is used to generate distortion 204, number of encode bits 211, and proportion of syntax bits 212. As discussed, simple prediction encode 312 evaluates limited numbers of available intra and/or inter modes, evaluates limited or no partitioning options for blocks, limits or eliminates in loop and out of loop filtering, and so on. As shown, simple prediction encode 312 is used to generate distortion 204 as a measure of difference between input pixel values and predicted pixel values (i.e., predicted using simple prediction encode 312).

Constant QP encode 316 may perform any suitable encode using a constant (and predetermined) QP such as a QP of 32 or 40 for all frames of input video. In some embodiments, constant QP encode 316 of downsampled intra or scene change frame 302 provides a more complex encode with respect to simple prediction encode 312 and evaluates more intra/inter modes, evaluates partitions, and so on. However, constant QP encode 316 may still provide a more limited encode with respect to the encode employed by encoder 105. As shown, constant QP encode 316 is used to generate number of encode bits 211, as a total number of bits for downsampled intra or scene change frame 302 as generated by the constant QP encode 316, and proportion of syntax bits 212, as a number of syntax bits generated by the constant QP encode 316 divided by the total number of bits generated by the constant QP encode 316.

As discussed with respect to FIG. 2, features 310 are employed in any of feature vectors 113, 201, 210. Turning to FIG. 1, any such feature vector is represented as feature vector 113, which is provided to machine learning based QP estimation module 104 and, as needed, machine learning based QP estimation module 107. As shown, feature vector 113 and target frame size 114 (e.g., a target bitrate for an intra or scene change frame) are provided as an input 115 to machine learning based QP estimation module 104, which generates an estimated QP 116 (QP1) that is used for a first pass encode. In some embodiments, only a first pass encode is employed. In some embodiments, feature vector 113 is pre-processed such that the overall input data values are transformed to certain ranges with means that are close to zero. Such techniques improve hardware implementation and improve model training and accuracy. Machine learning based QP estimation module 104 may employ any pretrained machine learning model. In some embodiments, machine learning based QP estimation module 104 implements a neural network model.

Figure 4:
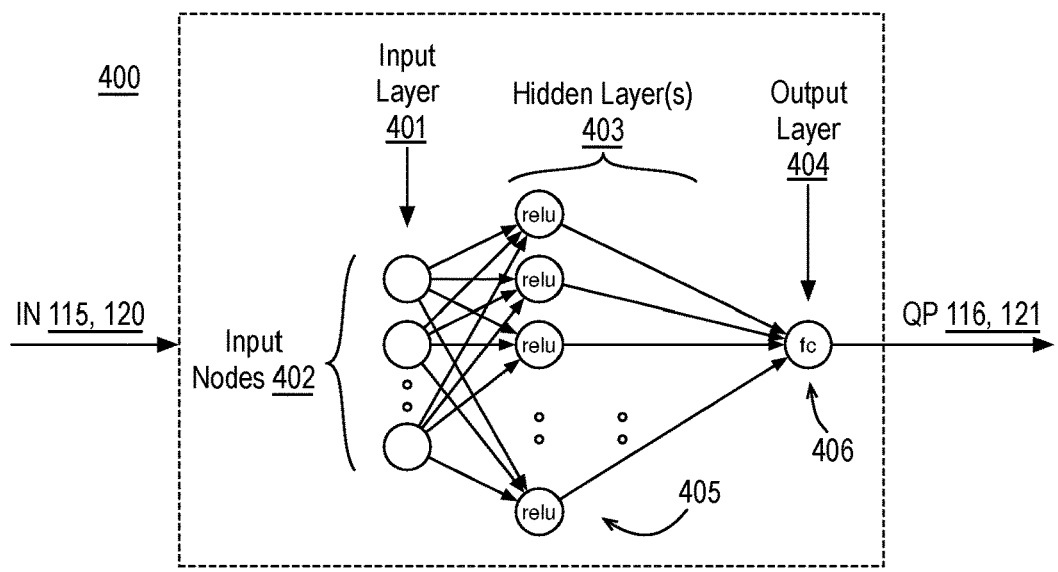
FIG. 4 illustrates an example deep neural network for determination of a quantization parameter for an intra or scene change frame.

FIG. 4 illustrates an example deep neural network 400 for determination of a quantization parameter for an intra or scene change frame, arranged in accordance with at least some implementations of the present disclosure. As used herein, the term neural network indicates any model or algorithm built using interconnected nodes between an input layer of nodes and an output layer node. For example, deep neural network 400 may be implemented via machine learning based QP estimation modules 104, 107 and based on inputs 115, 120. As shown in FIG. 4, deep neural network 400 may include an input layer 401 having any number of input nodes 402, one or more hidden layers 403 having hidden layer nodes 405, and an output layer 404 having a single output layer node 406. Deep neural network 400 may include any suitable number of input nodes 402, hidden layer nodes 405, and output nodes 406. Input layer 401 may include any suitable number of nodes such as a number of nodes equal to the number of elements in inputs 115, 120 or feature vectors thereof.

Furthermore, as in the illustrated example, deep neural network 400 includes a single hidden layer 403, in accordance with some embodiments. However, deep neural network 400 may include any number of hidden layers 403 having any number of nodes. In some embodiments, deep neural network 400 has two hidden layers 403. In some embodiments, deep neural network 400 has three hidden layers 403. More hidden layers may be employed. As shown, in some embodiments, each hidden layer node 405 implements a rectified linear unit (relu) as the activation thereof. However, any suitable activation functions may be employed. In some embodiments, output layer node 406 provides fully connected summation of the inputs thereto. In some embodiments, the resultant output layer value is converted to a closes integer and provided as estimated QP 116 or estimated QP 121. Although illustrated with respect to a deep neural network 400, machine learning based QP estimation modules 104, 107 may implement any neural network or machine learning model.

Returning to FIG. 1, as shown, estimated QP 116 is used as an encode QP (eQP) by encoder 105 to encode the current intra or scene change frame to generate bitstream 117 (bitstream1), which may be characterized as a first pass bitstream. Encoder 105 may encode the current intra or scene change frame using any suitable technique or techniques such as standards compliant coding techniques. In an embodiment, estimated QP 116 is implemented for the current intra or scene change frame during a quantization of blocks and/or residual blocks of the current intra or scene change frame as is known in the art.

As discussed, in some embodiments, only single pass encoding is used and bitstream 117 is provided as an output of system 100. In some embodiments, multi-pass encoding may be employed such that a second pass is performed for the intra or scene change frame when a resultant number of bits 118 (Bits1) generated based on the encode deviates from the target frame size 114. In some embodiments, second pass decision module 106 determines a difference between target frame sizes 114 (i.e., a target bitrate) and bits 118 (e.g., the number of bits from the encode of the intra or scene change frame by encoder 105 using estimated QP 116). When the difference compares favorably (e.g., exceeds) the threshold (e.g., about 3% to 5% of target frame sizes 114), a second pass is performed as indicated by second pass encoding signal 119. Otherwise, second pass encoding may be bypassed as also indicated by second pass encoding signal 119.

When second pass encoding is performed, as shown, machine learning based QP estimation module 107 receives feature vector 113 and resultant number of bits 118. Notably, machine learning based QP estimation module 107 may employ the same machine learning model as machine learning based QP estimation module 104 using the same feature vector 113 but a different input bitrate (i.e., resultant number of bits 118 in place of target frame size 114). Machine learning based QP estimation module 107 applies the machine learning model (i.e., as discussed with respect to FIG. 4) and generates an estimated QP 121 (QP2).

Estimated QP 121 is then used to modify estimated QP 116 to generate an encode QP (eQP) for encode of the intra or scene change frame such that the encode QP is a function of estimated QP 116 and estimated QP 121 (eQP=f(QP1, QP2). In some embodiments, an encode QP (eQP) is a linear combination of estimated QP 116 and a difference between estimated QP 116 and estimated QP 121. In some embodiments, the linear combination is a difference between estimated QP 116 and a factor multiplied by the difference between estimated QP 116 and estimated QP 116. In some embodiments, the encode QP is generated as shown in Equation (1):

$$eQP = QP1 - c*(QP1 - QP2) \tag{1}$$

where eQP is the encode QP (i.e., the QP used for encode in the second pass), QP1 is estimated QP 116 (i.e., generated using feature vector 113 and target frame sizes 114), QP2 is estimated QP 121 (i.e., generated using feature vector 113 and resultant number of bits 118 from the first pass encode), and c is the factor. Factor c may be an suitable value. In some embodiments, factor c is not less than 0.5. In some embodiments, factor c is not less than 0.6. In some embodiments, factor c is not less than 0.75. In some embodiments, factor c is in the range of 0.6 to 0.8.

For example, although the discussed application of a machine learning using estimated QP 116 (e.g., based on a first pass QP estimation) provides high accuracy, in some contexts, the resultant estimated QP 116 may still miss target frame size 114 under some (rare) conditions and second pass encoding is needed to maintain encode quality. In some embodiments, the second pass QP adjustment includes replacing the target frame size (used in first pass QP derivation) with the actual generated size (i.e., bits) from the first pass encoding to generate a new machine learning model input, applying the same machine learning model to the new input to derive a new estimated QP (QP2), and determining a final QP (eQP) for the second pass encoding as shown in Equation (1).

Furthermore, such techniques provide an input and output pair including the current feature vector and target frame size as the input and the encode QP (as generated using Equation (1) or similar techniques) as the output. The generated input and output pair may then be used as a training pair to train the machine learning model on the fly. In some embodiments, parameters of the machine learning model (e.g., deep neural network 400) are updated via on the fly training using the features of feature vector 113 and the encode QP (eQP) as a training input-output pair. Such on the fly training may be performed using any suitable technique or techniques such as back propagation parameter update techniques.

Discussion now turns to pretraining the machine learning model (e.g., a deep neural network) implemented by machine learning based QP estimation modules 104, 107. Notably, machine learning model such as neural networks provide for prediction with the prediction accuracy and robustness being dependent on the training data used to pretrain the model.

Figure 5:
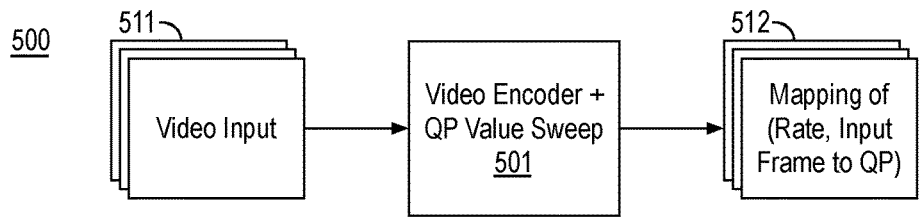
FIG. 5 is an illustrative diagram of an example training corpus generator for generating ground truth training data to train a machine learning model to generated estimated quantization parameters for intra or scene change frames.

FIG. 5 is an illustrative diagram of an example training corpus generator 500 for generating ground truth training data to train a machine learning model to generated estimated quantization parameters for intra or scene change frames, arranged in accordance with at least some implementations of the present disclosure. As shown in FIG. 5, training corpus generator 500 may include a video encoder 501 that may provide constant QP encoding of input frames 511 across QP values (e.g., a constant QP encoding of each of input frames 511 is performed at a variety of QP values) to generate a ground truth mapping 512. For example, as shown in FIG. 5, ground truth mapping 512 may map inputs of a target bitrate and frame to an output of a QP such that the QP was determined by video encoder 501 encoding the frame (corresponding to a ground truth input for training the neural network) at the QP (corresponding to a ground truth output for training the neural network) to provide a bitrate (corresponding to a ground truth input for training the neural network).

As discussed, QP prediction may be modeled such that given a specific target frame size (e.g., bitrate) and input intra or scene change frame, determining a target QP value. To build ground truth mapping 512 for training a machine learning model such as a deep neural network, the inverse of the QP prediction model may be used to build ground truth information between input intra or scene change frames, target frame size (e.g., bitrate), and QP as follows in Equation (2):

$$\text{Rate}=f_{encode}(QP, \text{input\_frame}) \qquad (2)$$

where $f_{encode}$ is a function that translates QP and input frame to frame size (e.g., bitrate). Therefore, by going through the encode process for sample input intra or scene change frames and across QPs, ground truth mapping 512 (e.g., mapping the relationship between input intra or scene change frames/target bitrates as inputs and the QP values as outputs) is provided.

Figure 6:
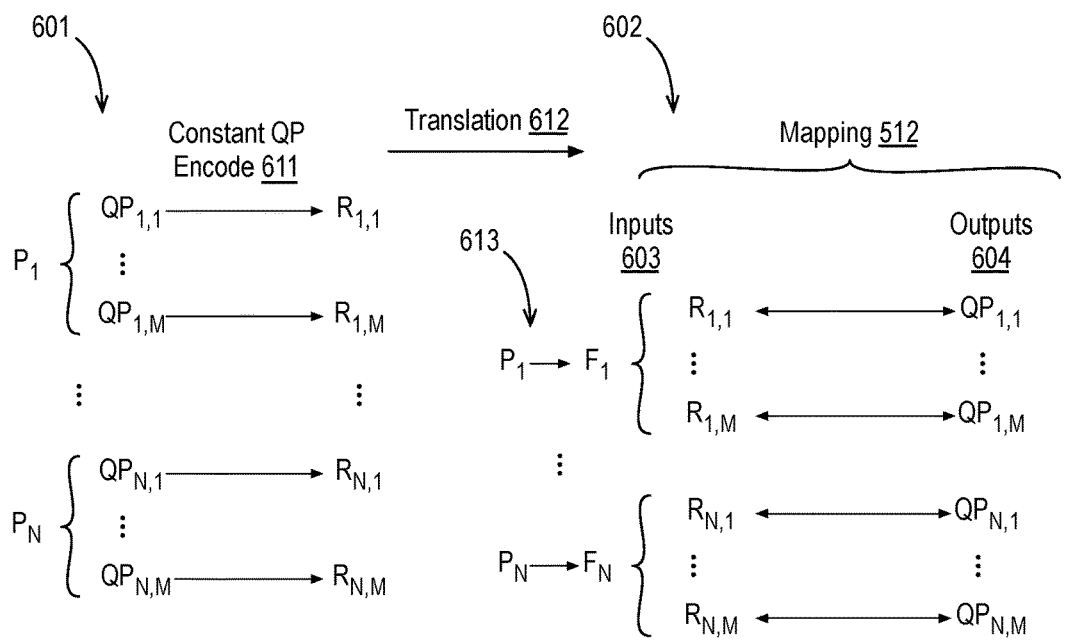
FIG. 6 is an illustrative diagram of example data structures for providing an example ground truth mapping for training a machine learning model for quantization parameter estimation.

FIG. 6 is an illustrative diagram of example data structures 601, 602 for providing an example ground truth mapping 512 for training a machine learning model for quantization parameter estimation, arranged in accordance with at least some implementations of the present disclosure. As shown in FIG. 6, in some embodiments, data structure 601 includes multiple training intra or scene change frames (i.e., $P_1$-$P_N$) selected using any suitable technique or techniques such as selection based on inclusion of a wide range of video frame scenarios such as outdoor scenes, indoor scenes, scenes with people, etc. As shown, data structure 601 may be generated or built by, for each frame and for each QP value of a range of QP values (i.e., $QP_1$-$QP_M$), performing a constant QP encode 611 on each combination thereof. The QP values may be each QP value in a range of QP values allowed by a standard (e.g., 1 to 51 for HEVC), a subset thereof, or any suitable selection of QP values. As discussed, for each combination of input frame (1-N) and QP value (1-M), constant QP encode 611 is performed to generate a corresponding bitrate value ($R_{1,1}$-$R_{N,M}$).

As shown, a translation 612 of data structure 601 and feature extraction 613 may be performed to generate data structure 602, which may provide ground truth mapping 512 between inputs 603 and outputs 604. For example, inputs 603 and outputs 604 may be used for machine learning model training. For example, feature extraction 613 may be performed using any suitable technique or techniques discussed herein with respect to generating feature vector 113 including features 310 from intra or scene change frames of input video 111. For example, feature extraction 613 may include determining one or more of a proportion of smooth blocks, a measure of block variance (i.e., average block variance), a prediction distortion, a number of encode bits, and a proportion of syntax bits for intra or scene change training frames (i.e., $P_1$-$P_N$) to generate corresponding features (i.e., $F_1$-$F_N$). The features for each of the training frames are then combined with known frame sizes (e.g., bitrates, R) to provide multiple inputs 603 each of which is known to correspond to a QP (also as discussed with respect to data structure 601). Such correspondence or ground truth mapping 512 between inputs 603 and outputs 604 is then used to train a machine learning model.

Figure 7:
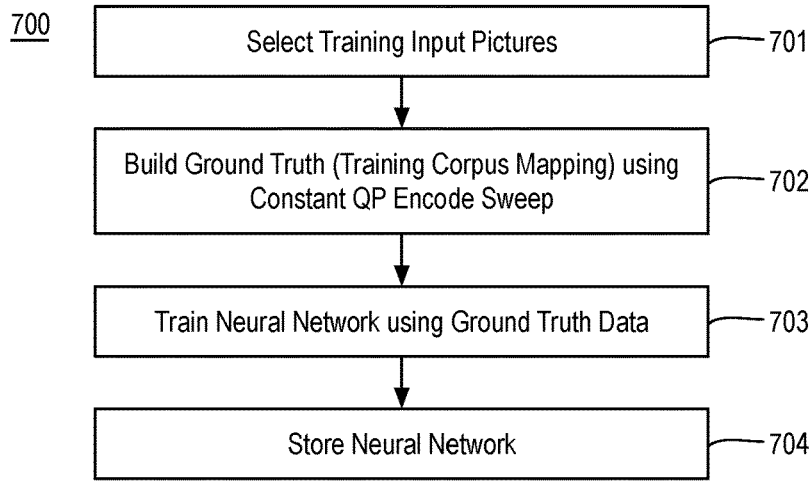
FIG. 7 is a flow diagram illustrating an example process for training a machine learning model for quantization parameter estimation.

FIG. 7 is a flow diagram illustrating an example process 700 for training a machine learning model for quantization parameter estimation, arranged in accordance with at least some implementations of the present disclosure. Process 700 may include one or more operations 701-704 as illustrated in FIG. 7. Process 700 may be performed by a device or system (e.g., system 900) to generate a pretrained machine learning model such as a pretrained neural network.

Process 700 begins at operation 701, where a set of training video intra or scene change frames are selected. The set of training video frames may include any suitable set of training video frames such as a set of frames with a variety of scenes (outdoor, indoor, scenes with people, etc.) at a variety of resolutions, complexities, etc. Any number of training video frames may be used for the training set such as thousands, tens of thousands, or more.

Processing continues at operation 702, where ground truth information is built using constant QP encoding to generate a training corpus matching. For example, for each frame of the set of training video frames a constant QP encoding may be performed at a variety of QP values (e.g., at each or some of the available 1-51 QP values) to determine, for each frame/QP value pair, a bitrate value. The constant QP encoding may be performed using any suitable technique or techniques that matches the ultimate encode that is to be performed during implementation. For example, the constant QP encoding may be a standards compliant encode. Furthermore, for each intra or scene change frame of the set of training video intra or scene change frames, features are extracted using any suitable technique or techniques that, again, match the feature extraction to be performed during implementation. The training mapping is then generated with inputs being combinations of features/frame sizes (e.g., bitrates) and the output for each combination being the QP that determined the corresponding bitrate. In an embodiment, the training mapping is generated as discussed with respect to data structures 601, 602.

Processing continues at operation 703, where the ground truth information training mapping discussed with respect to operation 702 is used to train a machine learning model such as a deep learning neural network. The machine learning model (e.g., deep learning neural network) may be trained using any suitable technique or techniques. Processing continues at operation 704, where the machine learning model is stored for subsequent implementation. For example, parameters characteristic of the trained model may be stored to memory in any suitable data structure.

Figure 8:
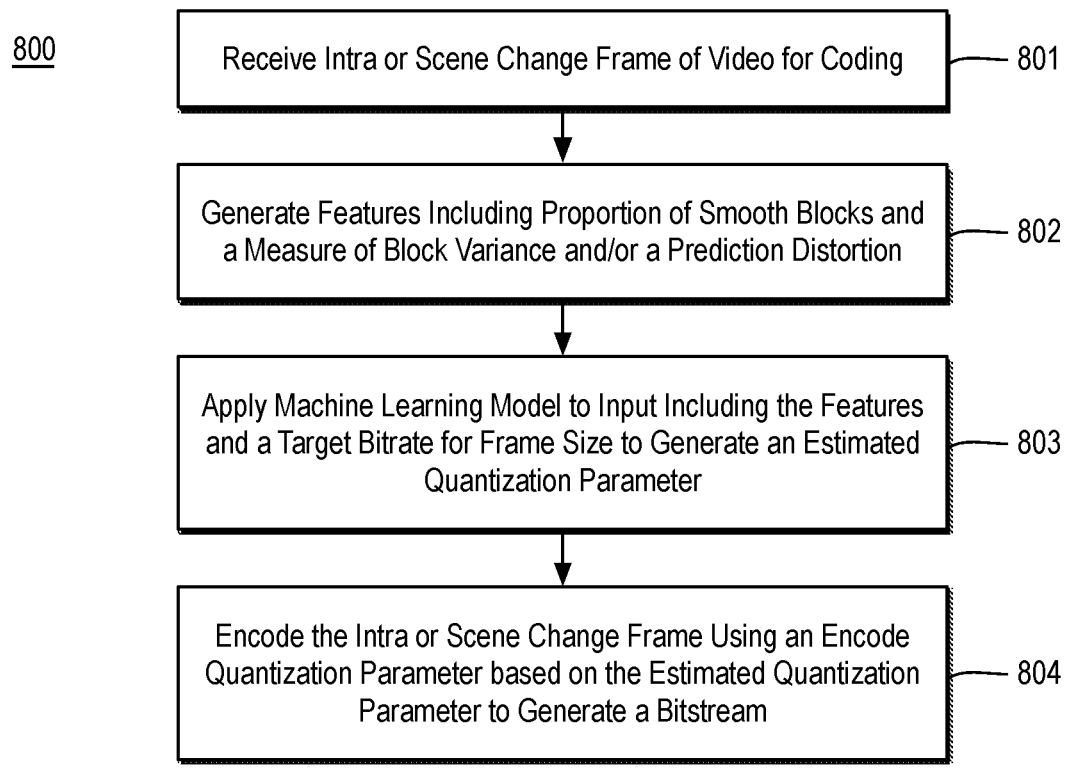
FIG. 8 is a flow diagram illustrating an example process for video coding including determination of a quantization parameter for an intra or scene change frame.

FIG. 8 is a flow diagram illustrating an example process 800 for video coding including determination of a quantization parameter for an intra or scene change frame, arranged in accordance with at least some implementations of the present disclosure. Process 800 may include one or more operations 801-804 as illustrated in FIG. 8. Process 800 may form at least part of a video coding process. By way of non-limiting example, process 800 may form at least part of a video coding process as performed by any device or system as discussed herein such as system 100. Furthermore, process 800 will be described herein with reference to system 900 of FIG. 9.

Figure 9:
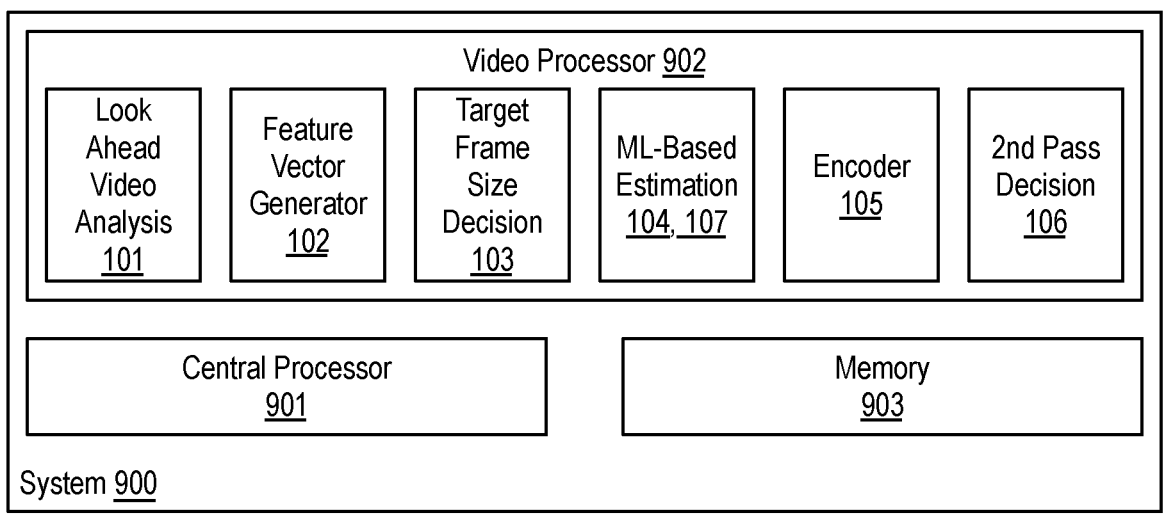
FIG. 9 is an illustrative diagram of an example system for video coding including determination of a quantization parameter for an intra or scene change frame.

FIG. 9 is an illustrative diagram of an example system 900 for video coding including determination of a quantization parameter for an intra or scene change frame, arranged in accordance with at least some implementations of the present disclosure. As shown in FIG. 9, system 900 may include a central processor 901, a video processor 902, and a memory 903. Also as shown, video processor 902 may include or implement look ahead video analysis module 101, feature vector generator 102, target frame size decision module 103, machine learning based QP estimation modules 104, 107, encoder 105, and second pass decision module 106. In an embodiment, memory 903 stores a machine learning model for implementation. Furthermore, in the example of system 900, memory 903 may store video data or related content such as intra or scene change frame data, analytics data, feature values, feature vectors, target frame rates, bitrates, encoded data, model parameter data, quantization parameters, bitstream data, and/or any other data as discussed herein.

As shown, in some embodiments, video processor 902 implements look ahead video analysis module 101, feature vector generator 102, target frame size decision module 103, machine learning based QP estimation modules 104, 107, encoder 105, and second pass decision module 106. In some embodiments, one or more of look ahead video analysis module 101, feature vector generator 102, target frame size decision module 103, machine learning based QP estimation modules 104, 107, encoder 105, and second pass decision module 106 are implemented by central processor 901, a graphics processor, or the like.

Video processor 902 may include any number and type of video, image, or graphics processing units that may provide the operations as discussed herein. Such operations may be implemented via software or hardware or a combination thereof. For example, video processor 902 may include circuitry dedicated to manipulate frames, frame data, or the like obtained from memory 903. Central processor 901 may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory.

In an embodiment, one or more or portions of look ahead video analysis module 101, feature vector generator 102, target frame size decision module 103, machine learning based QP estimation modules 104, 107, encoder 105, and second pass decision module 106 are implemented via an execution unit (EU). The EU may include, for example, programmable logic or circuitry such as a logic core or cores that may provide a wide array of programmable logic functions. In an embodiment, one or more or portions of look ahead video analysis module 101, feature vector generator 102, target frame size decision module 103, machine learning based QP estimation modules 104, 107, encoder 105, and second pass decision module 106 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 begins at operation 801, where an intra or scene change frame of input video is received for encoding. The intra or scene change frame may be any suitable intra or scene change frame in any suitable format. For example, the picture may be received by memory 903 for storage and subsequently by video processor 902 for processing.

Processing continues at operation 802, where a number of features are generated based on the intra or scene change frame of input video. The generated features may include any features discussed herein. In some embodiments, the features include a proportion of smooth blocks corresponding to the intra or scene change frame and at least one of a measure of block variance of blocks corresponding to the intra or scene change frame or a prediction distortion corresponding to the intra or scene change frame. In some embodiments, the features include the proportion of smooth blocks, the measure of block variance, and the prediction distortion. In some embodiments, the proportion of smooth blocks is a proportion or percentage of the blocks having a block variance that does not exceed a threshold, the measure of block variance is an average of the block variances of the blocks, and/or the predicted distortion is based on a difference between pixels corresponding to the intra or scene change frame and reference pixels corresponding to the intra or scene change frame. In some embodiments, the features include the proportion of smooth blocks, the measure of block variance, the prediction distortion, a number of bits generated by a look ahead encode of the intra or scene change frame and a proportion of syntax bits of the number of bits from the look ahead encode.

Processing continues at operation 803, where a machine learning model is applied to an input comprising the features and a target bitrate for the intra or scene change frame to generate an estimated quantization parameter for the intra or scene change frame. The machine learning model may be any machine learning model discussed herein. In some embodiments, the machine learning model is a neural network including an input layer, a hidden layer, and an output layer. In some embodiments, the machine learning model is pretrained using a training set comprising a number of feature vectors generated using corresponding training intra or scene change frames and a number of input frame sizes and corresponding ground truth quantization parameters for each of the training intra or scene change frames generated by encoding each training intra or scene change frame using a number of available quantization parameters.

Processing continues at operation 804, where the intra or scene change frame is encoded using an encode quantization parameter based on the estimated quantization parameter to generate at least a portion of a bitstream. In some embodiments, the encode is performed using the estimated quantization parameter generated at operation 803 and the resultant bitstream is output. For example, the estimated quantization parameter generated at operation 803 may be used as a final encode quantization parameter.

In some embodiments, process 800 further includes encoding the intra or scene change frame using the estimated quantization parameter (generated at operation 803) and applying, in response to the target bitrate and a number of bits from said encoding the intra or scene change frame using the estimated encode quantization parameter having a difference that exceeds a threshold, the machine learning model to a second input including the features and the number of bits to generate a second estimated quantization parameter, such that the encode quantization parameter is based on the estimated quantization parameter and the second estimated quantization parameter. In some embodiments, the encode quantization parameter is a linear combination of the estimated quantization parameter and a difference between the estimated quantization parameter and the second estimated quantization parameter. In some embodiments, the linear combination is a difference between the estimated quantization parameter and a factor multiplied by the difference between the estimated quantization parameter and the second estimated quantization parameter.

In some embodiments, process 800 further includes updating parameters of the machine learning model via on the fly training using the features and the encode quantization parameter as a training input-output pair. For example, the features and the encode quantization parameter (generated based on the estimated quantization parameter and the second estimated quantization parameter) may be used as a ground truth input output pair to train the machine learning model and the updated parameters may be stored and used for application to subsequent intra or scene change frames.

Process 800 may be repeated any number of times either in series or in parallel for any number intra or scene change frames. As discussed, process 800 may provide for video encoding including determining a quantization parameter using a machine learning model such as a pretrained neural network.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity. In some embodiments, the operations discussed herein are performed by a system including a memory to store any data discussed herein and one or more processors to perform the operations of process 800 or others discussed herein.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein. In some embodiments, the operations discussed herein are performed by a non-transitory machine readable medium comprising a plurality of instructions that, in response to being executed on a computing device, cause the computing device to perform the operations.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
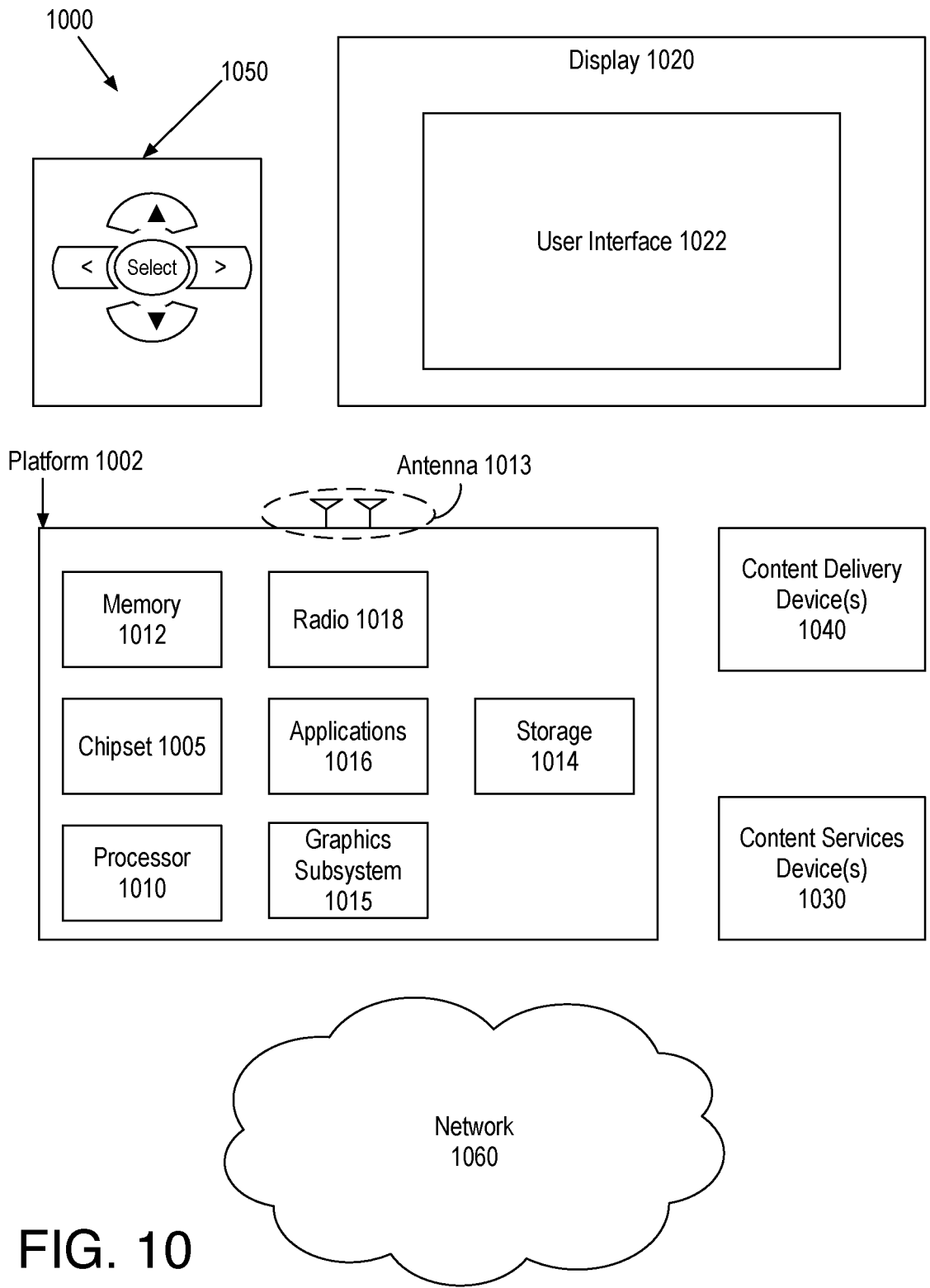
FIG. 10 is an illustrative diagram of an example system.

FIG. 10 is an illustrative diagram of an example system 1000, arranged in accordance with at least some implementations of the present disclosure. In various implementations, system 1000 may be a mobile system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of may be used to interact with user interface 1022, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1020) by movements of a pointer, cursor, focus ring, or other visual indicators displayed on the display. For example, under the control of software applications 1016, the navigation features located on navigation may be mapped to virtual navigation features displayed on user interface 1022, for example. In various embodiments, may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off" In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
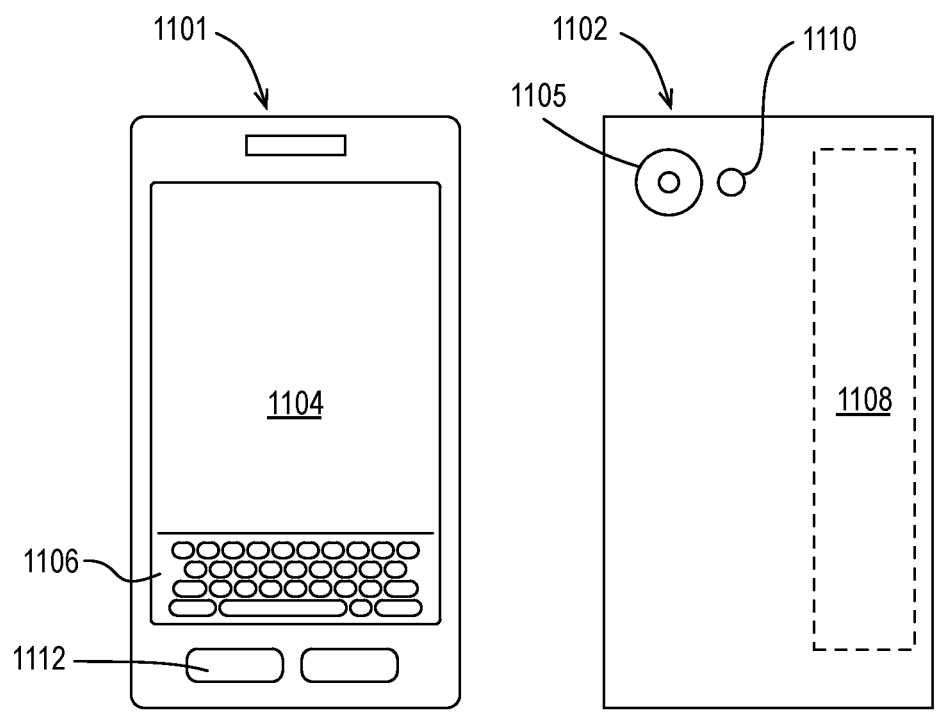
FIG. 11 illustrates an example device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, system 100 or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a method for video encoding comprises generating a plurality of features based on an intra or scene change frame of input video, the features comprising a proportion of smooth blocks corresponding to the intra or scene change frame and at least one of a measure of block variance of blocks corresponding to the intra or scene change frame or a prediction distortion corresponding to the intra or scene change frame, applying a machine learning model to an input comprising the features and a target bitrate for the intra or scene change frame to generate an estimated quantization parameter for the intra or scene change frame, and encoding the intra or scene change frame using an encode quantization parameter based on the estimated quantization parameter to generate at least a portion of a bitstream.

In one or more second embodiments, further to the first embodiment, the features comprise the proportion of smooth blocks, the measure of block variance, and the prediction distortion.

In one or more third embodiments, further to the first or second embodiments, the proportion of smooth blocks comprises a proportion or percentage of the blocks having a block variance that does not exceed a threshold, the measure of block variance comprises an average of the block variances of the blocks, and the predicted distortion is based on a difference between pixels corresponding to the intra or scene change frame and reference pixels corresponding to the intra or scene change frame.

In one or more fourth embodiments, further to any of the first through third embodiments, the features comprise a number of bits generated by a look ahead encode of the intra or scene change frame and a proportion of syntax bits of the number of bits from the look ahead encode.

In one or more fifth embodiments, further to any of the first through fourth embodiments, the method further comprises encoding the intra or scene change frame using the estimated quantization parameter and applying, in response to the target bitrate and a number of bits from said encoding the intra or scene change frame using the estimated encode quantization parameter having a difference that exceeds a threshold, the machine learning model to a second input comprising the features and the number of bits to generate a second estimated quantization parameter, wherein the encode quantization parameter is based on the estimated quantization parameter and the second estimated quantization parameter.

In one or more sixth embodiments, further to any of the first through fifth embodiments, the encode quantization parameter comprises a linear combination of the estimated quantization parameter and a difference between the estimated quantization parameter and the second estimated quantization parameter.

In one or more seventh embodiments, further to any of the first through sixth embodiments, the linear combination is a difference between the estimated quantization parameter and a factor multiplied by the difference between the estimated quantization parameter and the second estimated quantization parameter.

In one or more eighth embodiments, further to any of the first through seventh embodiments, the method further comprises updating parameters of the machine learning model via on the fly training using the features and the encode quantization parameter as a training input-output pair.

In one or more ninth embodiments, further to any of the first through eighth embodiments, the machine learning model is pretrained using a training set comprising a plurality of feature vectors generated using corresponding training intra or scene change frames and a plurality of input frame sizes and corresponding ground truth quantization parameters for each of the training intra or scene change frames generated by encoding each training intra or scene change frame using a plurality of available quantization parameters.

In one or more tenth embodiments, further to any of the first through ninth embodiments, the machine learning model comprises a neural network comprising an input layer, a hidden layer, and an output layer.

In one or more eleventh embodiments, a device or system includes a memory and one or more processors to perform a method according to any one of the above embodiments.

In one or more twelfth embodiments, at least one machine readable medium includes a plurality of instructions that in response to being executed on a computing device, cause the computing device to perform a method according to any one of the above embodiments.

In one or more thirteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:
1. A system for video coding comprising:
a memory to store at least a portion of an intra or scene change frame of input video; and
one or more processors coupled to the memory, the one or more processors to:
generate a plurality of features based on the intra or scene change frame, the features comprising a proportion of smooth blocks corresponding to the intra or scene change frame and at least one of a measure of block variance of blocks corresponding to the intra or scene change frame or a prediction distortion corresponding to the intra or scene change frame;
apply a machine learning model to a first input comprising the features and a target bitrate for the intra or scene change frame to generate a first estimated quantization parameter for the intra or scene change frame;
encode the intra or scene change frame the first estimated quantization parameter to generate a first bitstream having a number of bits;
determine whether a difference between the target bitrate and the number of bits of the first bitstream exceeds a threshold;
in response to determining the difference exceeds the threshold, apply the machine learning model to a second input comprising the features and the number of bits of the first bitstream to generate a second estimated quantization parameter for the intra or scene change frame; and encode the intra or scene change frame using an encode quantization parameter to generate a second bitstream, wherein the encode quantization parameter is a function of the first estimated quantization parameter and the second estimated quantization parameter.

2. The system of claim 1, wherein the features comprise the proportion of smooth blocks, the measure of block variance, and the prediction distortion.

3. The system of claim 2, wherein the proportion of smooth blocks comprises a percentage of the blocks having a block variance that does not exceed a threshold, the measure of block variance comprises an average of the block variances of the blocks, and the predicted distortion is based on a difference between pixels corresponding to the intra or scene change frame and reference pixels corresponding to the intra or scene change frame.

4. The system of claim 2, wherein the features comprise a number of bits generated by a look ahead encode of the intra or scene change frame and a proportion of syntax bits of the number of bits from the look ahead encode.

5. The system of claim 1, wherein the threshold has a value between 3% to 5% of the target bitrate.

6. The system of claim 5, wherein the encode quantization parameter comprises a linear combination of the first estimated quantization parameter and a difference between the first estimated quantization parameter and the second estimated quantization parameter.

7. The system of claim 6, wherein the linear combination is a difference between the first estimated quantization parameter and a factor multiplied by the difference between the first estimated quantization parameter and the second estimated quantization parameter.

8. The system of claim 5, the one or more processors further to:

update parameters of the machine learning model via on the fly training using the features and the encode quantization parameter as a training input-output pair.

9. The system of claim 1, wherein the machine learning model is pretrained using a training set comprising a plurality of feature vectors generated using corresponding training intra or scene change frames and a plurality of input frame sizes and corresponding ground truth quantization parameters for each of the training intra or scene change frames generated by encoding each training intra or scene change frame using a plurality of available quantization parameters.

10. The system of claim 1, wherein the machine learning model comprises a neural network comprising an input layer, a hidden layer, and an output layer.

11. A method for video encoding comprising:

generating a plurality of features based on an intra or scene change frame of input video, the features comprising a proportion of smooth blocks corresponding to the intra or scene change frame and at least one of a measure of block variance of blocks corresponding to the intra or scene change frame or a prediction distortion corresponding to the intra or scene change frame;

applying a machine learning model to a first input comprising the features and a target bitrate for the intra or scene change frame to generate a first estimated quantization parameter for the intra or scene change frame;

encoding the intra or scene change frame using the first estimated quantization parameter to generate a first bitstream having a number of bits;

determining whether a difference between the target bitrate and the number of bits of the first bitstream exceeds a threshold;

in response to determining the difference exceeds the threshold, applying the machine learning model to a second input comprising the features and the number of bits of the first bitstream to generate a second estimated quantization parameter for the intra or scene change frame; and encoding the intra or scene change frame using an encode quantization parameter to generate a second bitstream, wherein the encode quantization parameter is a function of the first estimated quantization parameter and the second estimated quantization parameter.

12. The method of claim 11, wherein the features comprise the proportion of smooth blocks, the measure of block variance, and the prediction distortion.

13. The method of claim 12, wherein the features comprise a number of bits generated by a look ahead encode of the intra or scene change frame and a proportion of syntax bits of the number of bits from the look ahead encode.

14. The method of claim 11, wherein the function computes a difference between the first estimated quantization parameter and a factor multiplied by the difference between the first estimated quantization parameter and the second estimated quantization parameter.

15. The method of claim 14, further comprising:

updating parameters of the machine learning model via on the fly training using the features and the encode quantization parameter as a training input-output pair.

16. At least one non-transitory machine readable medium comprising a plurality of instructions that, in response to being executed on a computing device, cause the computing device to perform video coding by:

generating a plurality of features based on an intra or scene change frame of input video, the features comprising a proportion of smooth blocks corresponding to the intra or scene change frame and at least one of a measure of block variance of blocks corresponding to the intra or scene change frame or a prediction distortion corresponding to the intra or scene change frame;

applying a machine learning model to a first input comprising the features and a target bitrate for the intra or scene change frame to generate a first estimated quantization parameter for the intra or scene change frame;

encoding the intra or scene change frame using the first estimated quantization parameter to generate a first bitstream having a number of bits;

determining whether a difference between the target bitrate and the number of bits of the first bitstream exceeds a threshold;

in response to determining the difference exceeds the threshold, applying the machine learning model to a second input comprising the features and the number of bits of the first bitstream to generate a second estimated quantization parameter for the intra or scene change frame; and encoding the intra or scene change frame using an encode quantization parameter to generate a second bitstream, wherein the encode quantization parameter is a function of the first estimated quantization parameter and the second estimated quantization parameter.

17. The at least one non-transitory machine readable medium of claim 16, wherein the features comprise the proportion of smooth blocks, the measure of block variance, and the prediction distortion.

18. The at least one non-transitory machine readable medium of claim 17, wherein the features comprise a number of bits generated by a look ahead encode of the intra or scene change frame and a proportion of syntax bits of the number of bits from the look ahead encode.

19. The at least one non-transitory machine readable medium of claim 16,
wherein the encode quantization parameter is a difference between the first estimated quantization parameter and a factor multiplied by a difference between the first estimated quantization parameter and the second estimated quantization parameter, and the factor is between 0.6 and 0.8.

20. The at least one non-transitory machine readable medium of claim 19, further comprising instructions that, in response to being executed on the computing device, cause the computing device to perform video coding by:
updating parameters of the machine learning model via on the fly training using the features and the encode quantization parameter as a training input-output pair.

* * * * *